US011256628B2

(12) United States Patent
Meiri et al.

(10) Patent No.: US 11,256,628 B2
(45) Date of Patent: Feb. 22, 2022

(54) VOLATILE READ CACHE IN A CONTENT ADDRESSABLE STORAGE SYSTEM

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 47 days.

(21) Appl. No.: 16/529,910

(22) Filed: Aug. 2, 2019

(65) Prior Publication Data

US 2021/0034538 A1 Feb. 4, 2021

(51) Int. Cl.
*G06F 12/0882* (2016.01)
*G06F 3/06* (2006.01)
*G06F 12/0817* (2016.01)

(52) U.S. Cl.
CPC .......... *G06F 12/0882* (2013.01); *G06F 3/067* (2013.01); *G06F 3/0614* (2013.01); *G06F 3/0638* (2013.01); *G06F 12/0824* (2013.01)

(58) Field of Classification Search
CPC .. G06F 3/0641; G06F 16/137; G06F 12/0882; G06F 3/0614; G06F 3/0638; G06F 3/067; G06F 12/0824
See application file for complete search history.

(56) References Cited

U.S. PATENT DOCUMENTS

| | | | |
|---|---|---|---|
| 9,396,243 B1* | 7/2016 | Halevi | G06F 16/27 |
| 9,442,941 B1* | 9/2016 | Luz | G06F 3/064 |
| 2005/0015567 A1* | 1/2005 | Zohar | G06F 12/0873 |
| | | | 711/203 |
| 2012/0297140 A1* | 11/2012 | Wu | G06F 12/0871 |
| | | | 711/133 |
| 2015/0309930 A1* | 10/2015 | Olorode | G06F 12/0864 |
| | | | 711/118 |
| 2016/0019148 A1* | 1/2016 | Vekiarides | G06F 12/0897 |
| | | | 711/122 |
| 2016/0216915 A1* | 7/2016 | Wu | G06F 3/0679 |
| 2016/0342338 A1* | 11/2016 | Wang | G06F 12/0877 |
| 2017/0286307 A1* | 10/2017 | Harvey | G06F 11/1446 |
| 2020/0110708 A1* | 4/2020 | Ma | G06F 12/0246 |
| 2020/0233804 A1* | 7/2020 | Gandhi | G06F 12/0804 |

* cited by examiner

*Primary Examiner* — Charles Rones
*Assistant Examiner* — Hewy H Li
(74) *Attorney, Agent, or Firm* — Krishnendu Gupta; Lesley Leonessa

(57) ABSTRACT

A distributed storage system comprises a first module and a second module. The first module processes read requests for an address range, to send to the second module. The first module receives an address associated with a read request for a data page stored on the second module. A method searches a table on the first module for a content-based signature of the data page based on the address and provides the data page from a first module read cache if the content-based signature is in the read cache, where content-based signatures in the table are associated with the address range.

20 Claims, 9 Drawing Sheets

| HASH METADATA (HMD) TABLE | | |
|---|---|---|
| HASH HANDLE 1 | REF COUNT 1 | PHYSICAL OFFSET OF DATA PAGE |
| HASH HANDLE 2 | REF COUNT 2 | PHYSICAL OFFSET OF DATA PAGE |
| ... | | |
| HASH HANDLE H | REF COUNT H | PHYSICAL OFFSET OF DATA PAGE |

TABLE KEY (Hash Handle column)

PHYSICAL LAYER BASED (PLB) TABLE — 306

| PHYSICAL OFFSET 1 | HASH DIGEST OF DATA PAGE | OTHER FIELDS |
| --- | --- | --- |
| PHYSICAL OFFSET 2 | HASH DIGEST OF DATA PAGE | OTHER FIELDS |
| ... | ... | ... |
| PHYSICAL OFFSET P | HASH DIGEST OF DATA PAGE | OTHER FIELDS |

TABLE KEY (Physical Offset column)

FIG. 3D

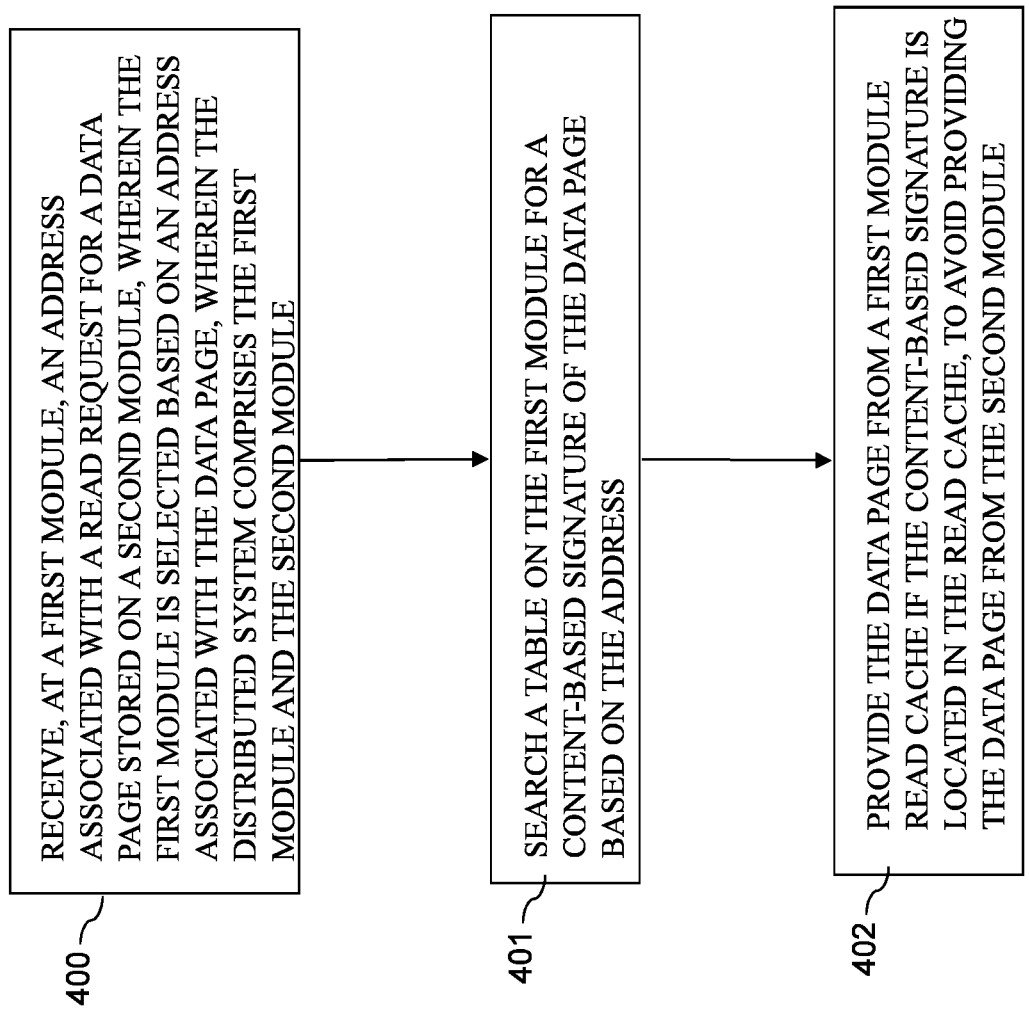

VOLATILE READ CACHE IN A CONTENT ADDRESSABLE STORAGE SYSTEM

TECHNICAL FIELD

This application relates to maintaining read caches in a distributed storage system.

DESCRIPTION OF RELATED ART

Various types of content addressable storage systems are known. Some content addressable storage systems allow data pages of one or more logical storage volumes to be accessed using content-based signatures that are computed from content of respective ones of the data pages. Some content addressable storage systems are arranged in a distributed storage system without a shared central memory.

BRIEF DESCRIPTION OF THE DRAWINGS

FIGS. 3A, 3B, 3C and 3D show examples of logical layer and physical layer mapping tables in an illustrative embodiment.

FIG. 4 is a flow diagram showing a process for maintaining read caches in a distributed storage system in an illustrative embodiment.

DETAILED DESCRIPTION

Figure 1:
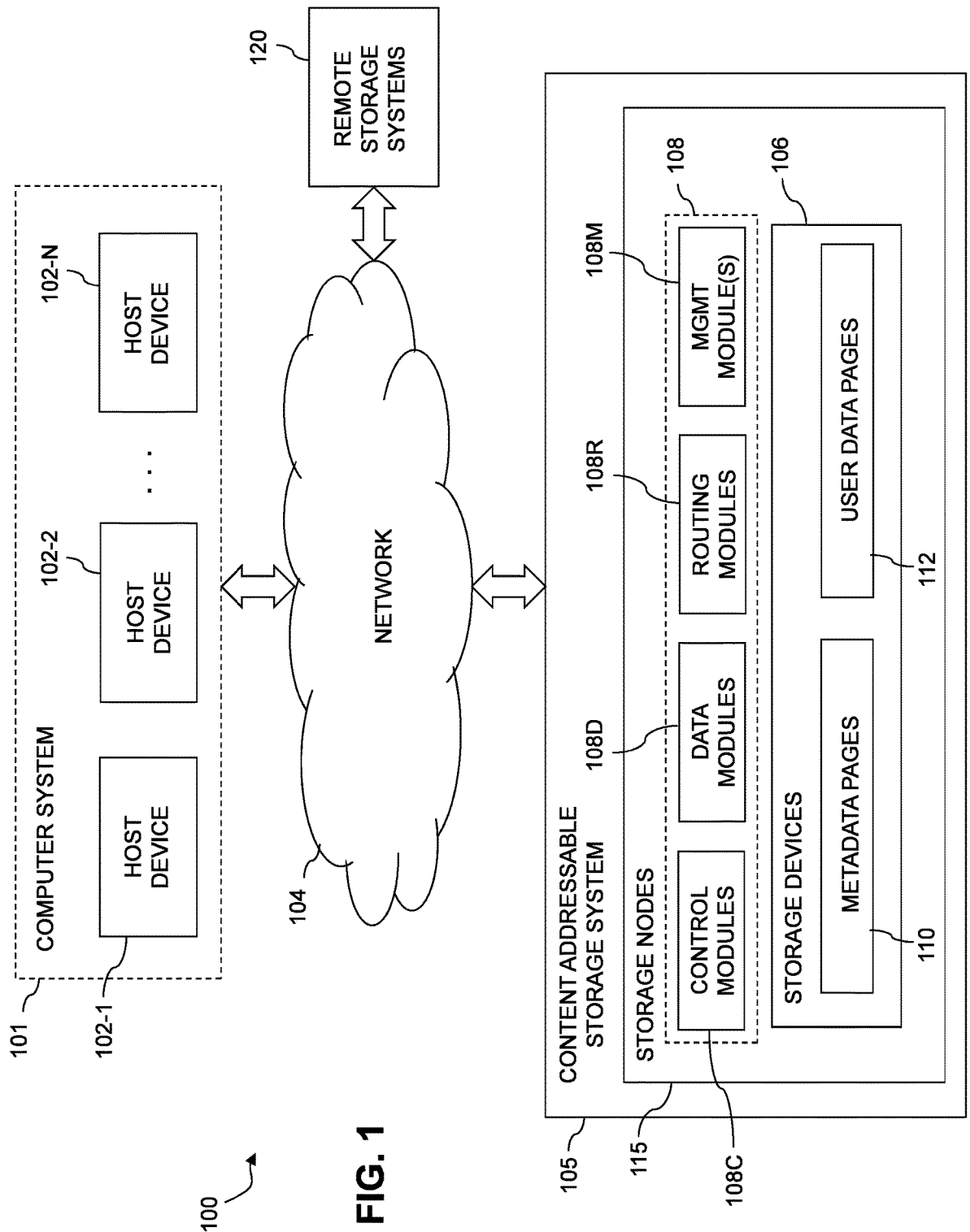
FIG. 1 is a block diagram of an information processing system comprising a content addressable storage system configured to maintain read caches in a distributed storage system in an illustrative embodiment.

Described below is a technique for use in maintaining read caches in a distributed storage system, the distributed storage system comprising a first module and a second module, the first module processing read requests for an address range, to send to the second module, which technique may be used to provide, receiving, at the first module, an address associated with a read request for a data page stored on the second module, where the first module is selected based on an address associated with the data page, searching a table on the first module for a content-based signature of the data page based on the address, and providing the data page from a first module read cache if the content-based signature is located in the read cache, where content-based signatures in the table are associated with the address range.

As described herein, in at least one embodiment of the current technique, a first module receives an address associated with a read request for a data page stored on a second module, where the first module is selected based on an address associated with the data page, and where the first module processes read requests for an address range, to send to the second module. The distributed storage system comprises the first module and the second module. A method searches a table on the first module for a content-based signature of the data page based on the address, and provides the data page from a first module read cache if the content-based signature is located in the read cache, where content-based signatures in the table are associated with the address range.

Conventional approaches to processing read requests in a content addressable storage system may be problematic under certain conditions. For example, the processing of read requests in a content addressable storage system requires transmitting the read request from the routing module to the control module based on an address associated with the read request. The control module looks up the address in the A2H table, locates the hash handle, and transmits the hash handle to the data module to serve up the requested data from the data module.

Conventional approaches to processing storage operations in a distributed storage system may also be problematic. Maintaining data in multiple local caches requires propagating the data to the other local caches when data in one of the caches is modified.

Conventional technologies do not provide a solution for maintaining read caches in a distributed storage system. Conventional technologies do not minimize resource usage by reducing the two step process of transmitting the read request from the routing module to the control module and from the control module to the data module, to a one step process where the control module provides the data in response to the read request. Conventional technologies do not provide a solution to build a cache of data pages that do not require invalidating or updating the cached pages for any write to the data pages. Conventional technologies do not provide a solution that does not require synchronization among several caches. Conventional technologies do not provide a plurality of read caches where each of the read caches maintains cache consistency for an associated address range. Conventional technologies maintain data page addresses as the key to the read caches. This results in data pages with the same data being stored at multiple addresses, resulting in a waste of system resources. Conventional technologies do not provide read caches that are keyed off hash handles. Conventional technologies do not provide read caches that are deduplication aware, and that will not store the same data twice for addresses that have the same page data.

By contrast, in at least some implementations in accordance with the current technique as described herein, a first module receives an address associated with a read request for a data page stored on a second module, where the first module is selected based on an address associated with the data page, and where the first module processes read requests for an address range, to send to the second module. The distributed storage system comprises the first module and the second module. A method searches a table on the first module for a content-based signature of the data page based on the address, and provides the data page from a first module read cache if the content-based signature is located in the table, where content-based signatures in the table are associated with the address range.

Thus, in at least one embodiment of the current technique, by maintaining read caches and serving up the data from the read caches, the method reduces the resources required to process read requests within a distributed storage system. The method also provides a process for maintaining the read caches that doesn't require maintaining cache consistency among a plurality of read caches within the distributed storage system.

Thus, a goal of the current technique is to provide a method and a system for maintaining read caches in a distributed storage system. Another goal is to reduce resources required to process read requests within a distributed storage system. Another goal is to provide read caches that are keyed based on hash handles. Another goal is to provide a system that automatically deduplicates data when populating the read cache. Yet another goal is to provide read caches that do not require synchronization among the other read caches within the distributed storage system.

In at least some implementations in accordance with the current technique described herein, maintaining read caches in a distributed storage system can provide one or more of the following advantages: minimizing resources to process read requests within a distributed storage system, building a cache of data pages that do not require invalidating or updating the cached pages for any write to the data pages, maintaining a plurality of read caches that do not require synchronization among the read caches, providing read caches that are keyed based on hash handles, and providing a plurality of read caches that are deduplication aware.

In contrast to conventional technologies, in at least some implementations in accordance with the current technique as described herein, a first module receives an address associated with a read request for a data page stored on a second module, where the first module is selected based on an address associated with the data page, and where the first module processes read requests for an address range, to send to the second module. The distributed storage system comprises the first module and the second module. A method searches a table on the first module for a content-based signature of the data page based on the address, and provides the data page from a first module read cache if the content-based signature is in the read cache, where content-based signatures in the table are associated with the address range.

In an example embodiment of the current technique, the method maintains a plurality of read caches for the distributed storage system where each of the plurality of read caches maintains cache consistency for a respective address range associated with each of the plurality of read caches.

In an example embodiment of the current technique, the method transmits the read request to the second module if the content-based signature is not in the read cache.

In an example embodiment of the current technique, the first module read cache is added to the first module, where a plurality of modules comprises the first module, where each of the plurality of modules is associated with a respective address range.

In an example embodiment of the current technique, a second module read cache is not added to a second module of the plurality of modules if the second module read cache would impact memory capacity of the second module.

In an example embodiment of the current technique, the method removes the first module read cache from the first module if the first module read cache is impacting memory capacity of the first module.

In an example embodiment of the current technique, the method receives at the first module, a read request from a third module for a second data page stored on the second module, and stores a copy of the second data page in the first module read cache if the second data page is associated with a second content-based signature stored in the table.

In an example embodiment of the current technique, the method receives at the first module, a write request to write a second data page on the second module, and stores a copy of the second data page in the first module read cache if the second data page is associated with a second content-based signature stored in the table.

In an example embodiment of the current technique, the first module read cache maintains a reference count for each data page stored in the first module read cache, where the reference count indicates a number of times each data page has been read.

In an example embodiment of the current technique, the method removes at least one of the each data page from the first module read cache based on the reference count.

In an example embodiment of the current technique, the method removes the data page from the first module read cache based on memory capacity associated with the first module.

In an example embodiment of the current technique, the method receives instruction from the second module to remove the data page from the first module read cache.

In an example embodiment of the current technique, the method receives at the first module, a second content-based signature from the second module, removes a second data page associated with the second content-based signature from the first module if the second content-based signature is located in the first module, and removes the second content-based signature from the first module.

In an example embodiment of the current technique, the method receives, at the first module, a second content-based signature from the second module, and updates a second data page associated with the second content-based signature with a new data page if the second content-based signature is located in the first module.

In an example embodiment of the current technique, a plurality of data pages is stored in the first module read cache and each of the plurality of data pages is associated with an address and a respective content-based signature, and when a subset of the plurality of data pages share the content-based signature, one of the subset of the plurality of data pages is stored in the first module read cache.

In an example embodiment of the current technique, the content-based signature is a hash handle.

In an example embodiment of the current technique, the first module read cache includes volatile memory.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, an infrastructure-as-a-service (IaaS) model and/or a function-as-a-service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash content addressable storage array such as an XtremIO™ storage array from Dell EMC of Hopkinton, Mass. For example, the content addressable storage system 105 can comprise an otherwise conventional XtremIO™ storage array or other type of content addressable storage system that is suitably modified to incorporate managing read caches as disclosed herein. Other types of storage arrays, including by way of example VNX® and Symmetrix VMAX® storage arrays also from Dell EMC, can be used to implement content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

It should be noted in this regard that the term "remote" as used herein, in the context of remote storage systems 120 and elsewhere, is intended to be broadly construed, and should not be interpreting as requiring any particular geographic location relationship to the content addressable storage system 105. For example, the given remote storage system can be in a different data center than the content addressable storage system 105, or could alternatively be at a different location within the same physical site. The term "remote" in illustrative embodiments herein can therefore simply indicate that the corresponding storage system is physically separate from the content addressable storage system 105.

Although multiple remote storage systems 120 are shown in the figure, it is to be appreciated that some embodiments may include only a single remote storage system.

Each of the storage nodes 115 of the content addressable storage system 105 is assumed to be implemented using at least one processing device comprising a processor coupled to a memory.

Other arrangements of storage nodes or other types of nodes can be used. The term "node" as used herein is intended to be broadly construed and a given such node need not include storage devices.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Each of the storage nodes 115 of the content addressable storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

It is assumed in some embodiments that the processing modules of the distributed storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The distributed storage controller 108 of the content addressable storage system 105 in the present embodiment is configured to provide managing read caches as disclosed herein. The distributed storage controller 108 is assumed to comprise a type of "processing device" as that term is broadly used herein, and more particularly comprises at least one processor coupled to a memory.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

In some embodiments, the content addressable storage system 105 comprises an XtremIO™ storage array suitably modified to incorporate techniques for managing read caches as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for managing read caches in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more IO operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various JO processing tasks.

The write requests from the host devices 102 identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 105. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments will be described below in conjunction with FIGS. 3A through 3D. These particular examples include respective A2H, H2D, HMD and physical layer based ("PLB") tables. In some embodiments, the A2H and H2D tables are utilized primarily by the control modules 108C, while the HMD and PLB tables are utilized primarily by the data modules 108D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective first and second distinct types. Other types and arrangements of mapping tables or other content-based signature mapping information may be used in other embodiments.

Such mapping tables are still more generally referred to herein as "metadata structures" of the content addressable storage system 105. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the content addressable storage system 105 correspond to respective physical blocks of a physical layer of the content addressable storage system 105. The user data pages of the logical layer are organized by LBA and have reference via respective content-based signatures to particular physical blocks of the physical layer.

Each of the physical blocks has an associated reference count that is maintained within the content addressable storage system 105. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for managing read caches in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

As indicated previously, the host devices 102 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least a one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controller 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
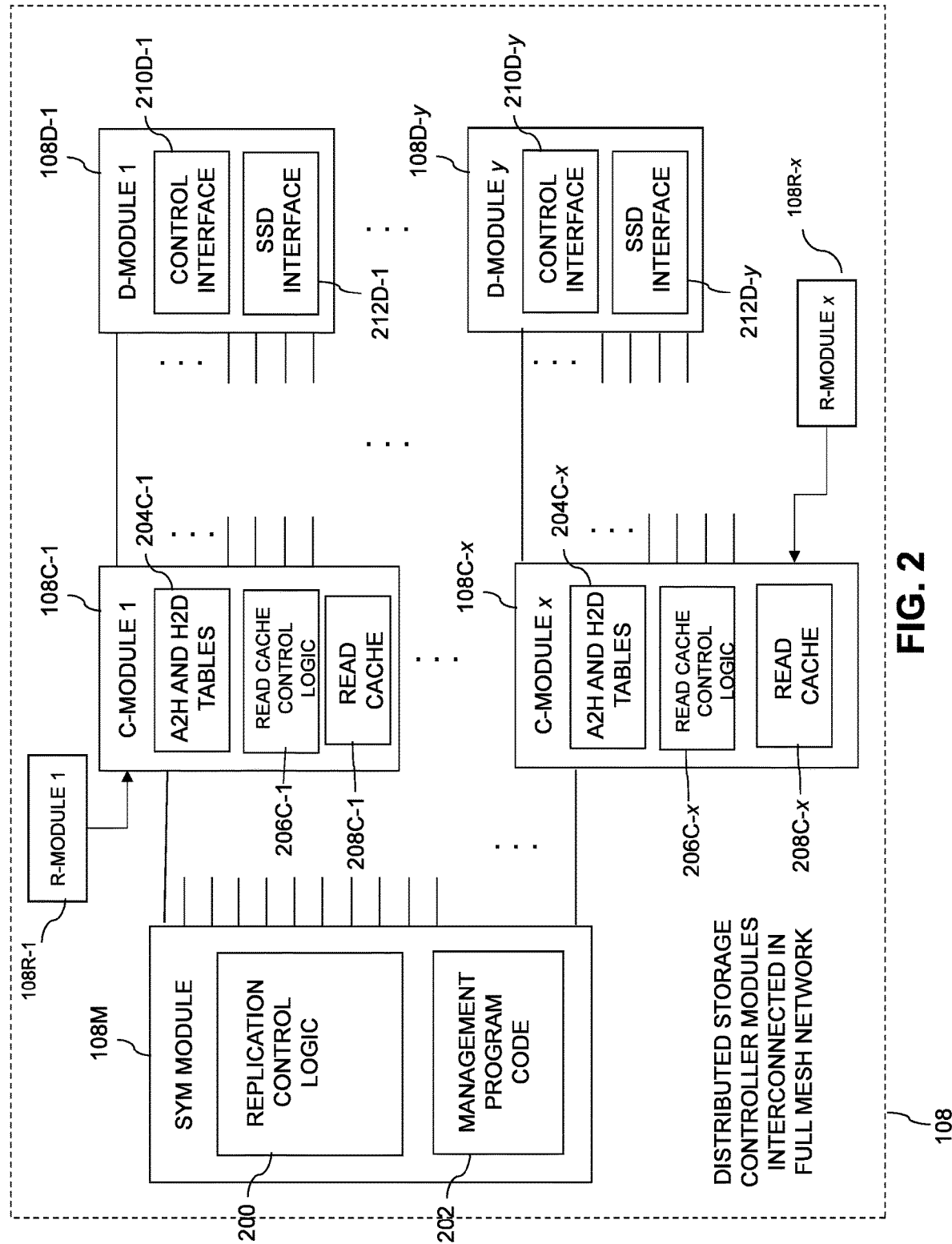
FIG. 2 illustrates a portion of a distributed storage controller of a content addressable storage system showing one possible arrangement utilizing control modules and data modules interconnected by a mesh network and configured to maintain read caches in a distributed storage system in an illustrative embodiment.

Referring now to FIG. 2, a more detailed view of a portion of the distributed storage controller 108 in an illustrative embodiment is shown. This embodiment illustrates an example arrangement of control modules 108C, data modules 108D and a management module 108M of the distributed storage controller 108. It is assumed in this embodiment that these and possibly other modules of the distributed storage controller 108 are interconnected in a full mesh network, such that each of the modules can communicate with each of the other modules, although other types of networks and different module interconnection arrangements can be used in other embodiments.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises replication control logic 200 and associated management program code 202. The management module 108M communicates with control modules 108C-1 through 108C-x, also denoted as C-module 1 through C-module x. The control modules 108C communicate with data modules 108D-1 through 108D-y, also denoted as D-module 1 through D-module y. The routing modules 108R-1 through 108R-x, also denoted as R-module 1 through R-module-x communicate with C-module 1 through C-module x. The variables x and y are arbitrary integers greater than one, and may but need not be equal. In some embodiments, each of the storage nodes 115 of the content addressable storage system 105 comprises one of the control modules 108C and one of the data modules 108D, as well as one or more additional modules including one of the routing modules 108R. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The control modules 108C-1 through 108C-x in the FIG. 2 embodiment comprise respective sets of A2H and H2D tables 204C-1 through 204C-x. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein. The control modules 108C-1 through 108C-x further comprise corresponding instances of read cache control logic 206C-1 through 206C-x to support maintaining read caches in a distributed storage system as disclosed herein. The control modules 108C-1 through 108C-x further comprise corresponding read caches 208C-1 through 208C-x.

In an example embodiment, the control module 108C-1 receives an address associated with a read request for data residing on data module 108D-1. The read request is transmitted from routing module 108R-1 to control module 108C-1 based on an address associated with the read request. As noted above each control module 108C-x "owns" slices comprised of data pages, and each control module 108C-x handles requests for data pages that reside in the slices under the control of the control module 108C-x. In an example embodiment, the read cache control logic 206C-1 looks up the address associated with the read request in the A2H table to locate the hash handle. The read cache control logic 206C-1 then looks up the hash handle in the read cache 208C-1 to determine whether the associated data page resides in the read cache 208C-1. If the associated data page is located within the read cache 208C-1, the read cache control logic 206C-1 serves up the data page in response to the read request. If the associated data page is not located within the read cache 208C-1, the read request is transmitted from the control module 108C-1 to the data module 108D-1, to be satisfied from the disk or from the data module cache. Thus, the key to the read cache 208C-1 is the hash handle.

In an example embodiment, the read cache control logic 206C-1 may evict pages from the read cache 208C-1 if those pages have not been accessed within a specified period of time, and/or if resources (used by the read cache 208C-1) are needed by the control module 108C-1. The read cache control logic 206C-1 may remove pages from the read cache 208C-1 based on Least Recently Used (LRU) or Low Inter-reference Recency Set (LIRS), for example.

The read cache control logic 206C-1 may remove pages from the read cache 208C-1 that are more likely not needed. The read cache control logic 206C-1 may also remove pages from the read cache 208C-1 if more memory is needed on the control module 108C-1. The read cache control logic 206C-1 may evict data pages that are not needed to preserve resources for data pages that are needed.

In one example embodiment, the read cache 208C-1 may have a reference count for each data page stored in the read cache 208C-1. The reference count measures how many times a data page was read. For example, the first time a data page is added to the read cache 208C-1, the reference count is set to one. In an example embodiment, if the same hash handle is added in a different location in the A2H table, the reference count is updated by adding one to the reference count. In an example embodiment, if the A2H table is updated and a data page is deleted, or a data page is overwritten, the read cache control logic 206C-1 looks up the deleted hash handle in the read cache 208C-1, and reduces the reference count by one. In an example embodiment, if a data page in the read cache 208C-1 has a reference count of zero, the read cache control logic 206C-1 may evict the data page from the read cache 208C-1. In an example embodiment, it is possible that the evicted page is still referenced by other parts of the A2H table. In this example scenario, the evicted data page may be located on the data module 108D-1. Thus, while additional resources will be consumed locating the data page on the data module 108D-1 (as opposed to serving up the data page from the read cache 208C-1), eviction of the data page from the control module 108C-1 does not result in loss of that data. In an example embodiment, it is important to keep data pages that are read more frequently in the read cache 208C-1 than data pages that are read less frequently.

In an example embodiment, the data module 108D-1 may be responsible for evicting data pages from the read cache 208C-1. For example, data pages in the read cache 208C-1 that have no corresponding hash handle in the A2H table may be evicted. In an example embodiment, when the data module 108D-1 detects that a reference count on a data page on the data module 108D-1 is zero, the data module 108D-1 may delete a data page from flash and tables. In this example embodiment, the data module 108D-1 transmits a message to the control module 108C-1 to discard the hash handle from the read cache 208C-1. After transmitting the message to the control module 108C-1, the data module 108D-1 may then delete the data page from the data module 108D-1.

Within the A2H table, multiple addresses may correspond to the same hash handle. In this example embodiment, the data page that corresponds to the hash handles (that are the same) is stored in the read cache 208C-1. Thus, if two addresses use the same hash handle, then the read cache control logic 206C-1 stores a single data page in the read cache 208C-1 because the read cache 208C-1 is searched by hash handle. Thus, the read cache control logic 206C-1 automatically performs deduplication without additional effort by virtue of using the hash handle as the key to the read cache 208C-1.

The control modules 108C may further comprise additional components not explicitly shown in FIG. 2, such as respective messaging interfaces that are utilized by the control modules 108 to generate control-to-routing messages for transmission to the routing modules 108R, and to process routing-to-control messages received from the routing modules 108R. Such messaging interfaces can also be configured to generate messages for transmission to the management module 108M and to process instructions and other messages received from the management module 108M.

The data modules 108D-1 through 108D-y in the FIG. 2 embodiment comprise respective control interfaces 210D-1 through 210D-y. These control interfaces 210D support communication between the data modules 108D and corresponding ones of the control modules 108C. Also included in the data modules 108D-1 through 108D-y are respective SSD interfaces 212D-1 through 212D-y. These SSD interfaces 212D support communications with corresponding ones of the storage devices 106.

Figure 3A:
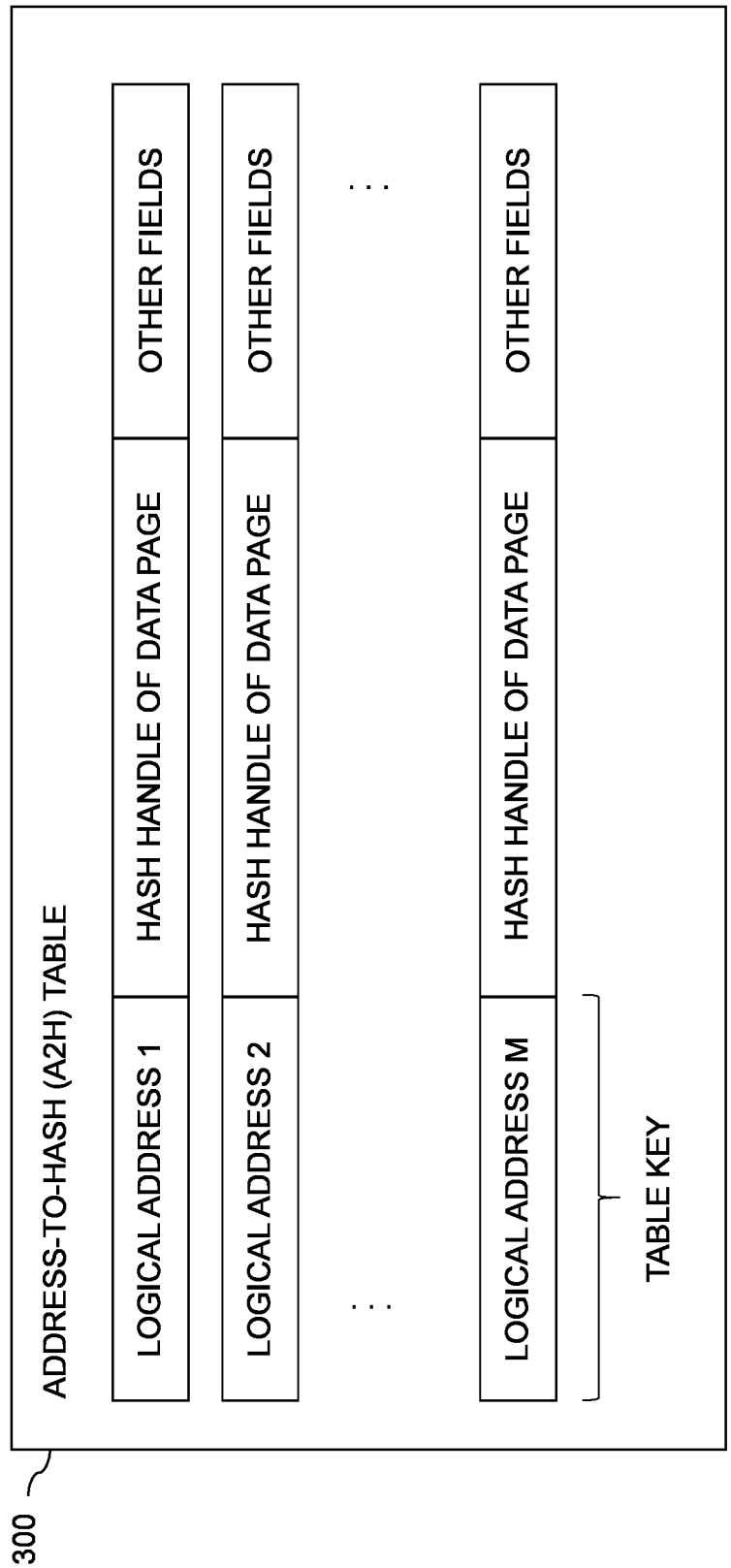

Referring initially to FIG. 3A, an A2H table 300 is shown. The A2H table 300 comprises a plurality of entries accessible utilizing logical addresses denoted Logical Address 1, Logical Address 2, . . . Logical Address M as respective keys, with each such entry of the A2H table 300 comprising a corresponding one of the logical addresses, a corresponding one of the hash handles, and possibly one or more additional fields.

Figure 3B:
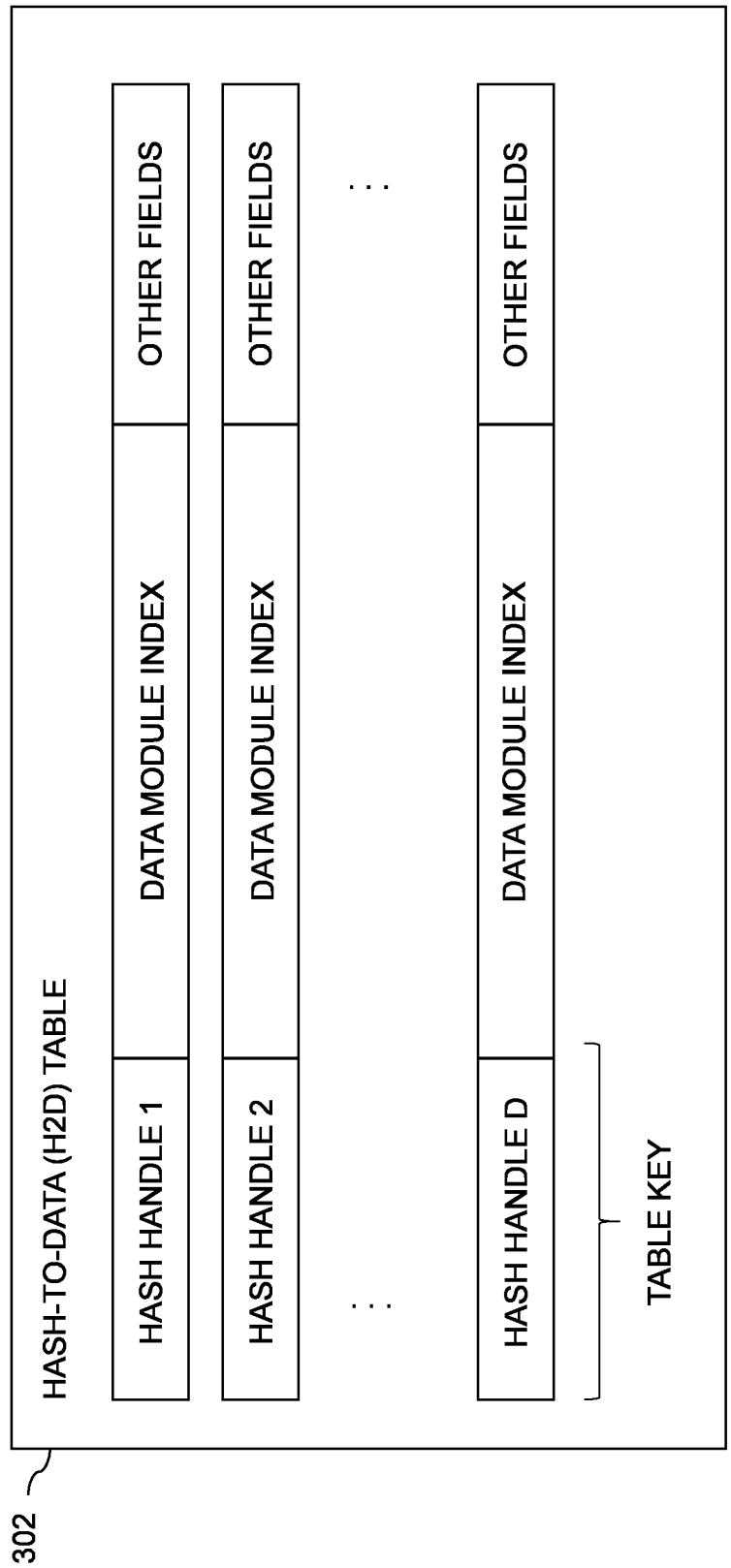

FIG. 3B shows an H2D table 302 that illustratively comprises a plurality of entries accessible utilizing hash handles denoted Hash Handle 1, Hash Handle 2, . . . Hash Handle D as respective keys, with each such entry of the H2D table 302 comprising a corresponding one of the hash handles, a data module index, and possibly one or more additional fields.

Referring now to FIG. 3C, an HMD table 304 comprises a plurality of entries accessible utilizing hash handles denoted Hash Handle 1, Hash Handle 2, . . . Hash Handle H as respective keys. Each such entry of the HMD table 304 comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. Although not explicitly so indicated in the figure, the HMD table 304 may also include one or more additional fields.

FIG. 3D shows a PLB table 306 that illustratively comprises a plurality of entries accessible utilizing physical offsets denoted Physical Offset 1, Physical Offset 2, . . . Physical Offset P as respective keys, with each such entry of the PLB table 306 comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Also, it is to be appreciated that terms such as "table" and "entry" as used herein are intended to be broadly construed, and the particular example table and entry arrangements of FIGS. 3A through 3D can be varied in other embodiments. For example, additional or alternative arrangements of entries can be used. I The operation of the information processing system 100 will now be described in further detail with reference to the flow diagram of FIG. 4. The distributed storage system comprises a first module and a second module. The first module processes read requests for an address range, to send to the second module. At 400, the first module, such as control module 108C-1, receives an address associated with read request for a data page stored on the second module, such as data module 108D-1. The first module is selected based on an address associated with the data page. In an example embodiment, routing module 108R-1 receives a read request from a host. The routing module 108R-1 selects control module 108C-1 to process the read request based on the address associated with the read request. The routing module 108R routes the read request to the control module 108C-1 (that controls the slice where the address resides). The read request is intended for data that resides on data module 108D-1.

At 401, the read cache control logic 206C-1 searches a table, such as the A2H table (204C-1) on the first module (control module 108C-1), for a content-based signature of the data page based on the address. In an example embodiment, the content-based signature is a hash handle. Using the hash handle, the read cache control logic 206C-1 searches the read cache 208C-1 for the hash handle. In an example embodiment, if the content-based signature (i.e., hash handle) is in the read cache, at 402, the read cache control logic 206C-1 provides the data page from a first module read cache (read cache 208C-1), where content-based signatures in the table are associated with the address range, as illustrated in FIG. 3A. In an example embodiment, the control module 108C-1 transmits the data page to the routing module 108R-1. In an example embodiment, the read cache 208C-1 may contain data pages that correspond to hash handles in the A2H table for read cache 208C-1. In an example embodiment, any hash handle that appears in the A2H table owned by a control module 108C-1 may have a page in the read cache 208C-1. In an example embodiment, for every read request that is received by the control module 108C-1, the read cache control logic 206C-1 looks up the address in the A2H table to locate the hash handle, and then looks up the hash handle in the read cache 208C-1. If the hash handle is in the read cache 208C-1, the associated data page is served up in response to the read request. If the hash handle is not located in the read cache 208C-1, then the read cache control logic 206C-1 transmits the read request to the data module 108D-1 to be serviced from flash or from the data module cache. In an example embodiment, the control module 108C-1 accesses the H2D table (FIG. 3B) to determine which data module 108D-y receives the read request.

In an example embodiment, the read cache control logic 206C-1 maintains a plurality of read caches 208C-x for the distributed storage system where each of the plurality of read caches maintains cache consistency for a respective address range associated with each of the plurality of read caches. In other words, each of the control modules 108C-x voluntarily maintains a read cache 208C-x. Each of the control modules 108C-x is responsible for a portion of the address space of the slices. Thus, there is only one owner per slice, and no other control module is required to be aware of the read cache 208C-1 controlled by a control module 108C-1. Additionally, no other control module 108C-1 is required to invalidate their own read cache 208C-1 when a data page in another control module's read cache 208C-x is invalidated when written. In an example embodiment, the read cache 208C-1 includes volatile memory. Thus, if data in the read cache 208C-1 is lost, there is only a temporary performance impact because the data must be retrieved from the corresponding data module 108D-1, but the data in the read cache 208C-1 is not lost because the data in the read cache 208C-1 is a copy of the data maintained in the data module 108D-1.

In an example embodiment, the read cache control logic 206C-1 transmits the read request to the second module (data module 108D-1) if the content-based signature is not in the read cache 208C-1. In other words, if the hash handle is not located in the read cache 208C-1, the read cache control logic 206C-1 transmits the read request from the first module (control module 108C-1) to the second module (data module 108D-1), where data module 108D-1 serves up the data in response to the read request. Thus, maintaining the read cache on the control module 108C-1 reduces the system resources needed to transmit the read request from control module 108C-1 to data module 108D-1, and instead, serves the data from the read cache 208C-1.

In an example embodiment, the first module read cache is added to the first module, where a plurality of modules comprises the first module, and where each of the plurality of modules is associated with a respective address range. In other words, the read cache is voluntarily added to the first module. The read cache may be any size, and the cache size may depend on the control module resources. In an example embodiment, there is no minimum size requirement for the read cache. In an example embodiment, any free memory may be allocated to the read cache. In an example embodiment, the read cache may be volatile memory and there may be no requirement to persist any of the cached data. These features make the read cache efficient and an easy to manage entity. Thus, each of the plurality of control modules in the distributed storage system (i.e., control module 108C-1 through 108C-x) may or may not each maintain a read cache 208C-x and each of the control modules (i.e., control module 108C-1 through 108C-x) control an address range associated with a slice. Each read cache contains data pages that correspond to hash handles owned by the respective control module. Thus, any hash handle that exists in an A2H table on a control module 108C-1 may have a data page in the read cache 208C-1 of that control module 108C-1.

In an example embodiment, a second module read cache is not added to a second module of the plurality of modules if the second module read cache would impact memory capacity of the second module. As noted above, each control module adds a read cache voluntarily. If adding a read cache would negatively impact the amount of memory available to the control module, then the read cache may not be added to that control module.

In an example embodiment, the read cache control logic 206C-1 removes the first module read cache from the first module if the first module read cache is impacting memory capacity of the first module. In other words, the read cache control logic 206C-1 may delete a read cache 208C-1 from a control module 108C-1 if the read cache 208C-1 is impacting the memory capacity of that control module 108C-1. In another example embodiment, the read cache control logic 206C-1 may remove a data page from the read cache 208C-1 if the memory capacity of the control module 108C-1 is impacted.

In an example embodiment, the read cache control logic 206C-1 receives at the first module, a read request from a third module for a second data page stored on the second module and stores a copy of the second data page in the first module read cache if the second data page is associated with a second content-based signature stored in the table. The read cache control logic 206C-1 may populate the read cache while processing read requests in the distributed storage system. In an example embodiment, the read cache 208C-1 may be built/populated when a read operation brings the data into the control module 108C-1 during the normal flow of data from the data module 108D-1 to the routing module 108R. In this example scenario, as the first module (control module 108C-1) processes read requests, the read cache control logic 206C-1 stores a copy of the data page associated with the read request in the read cache 208C-1 if the A2H table 204C-1 contains a hash handle associated with the received data page.

In an example embodiment, the read cache control logic 206C-1 receives at the first module, a write request to write a second data page on the second module and stores a copy of the second data page in the first module read cache if the second data page is associated with a second content-based signature stored in the table. In an example embodiment, the read cache control logic 206C-1 may populate the read cache 208C-1 while processing write requests in the distributed storage system. In an example embodiment, the read cache 208C-1 is built/populated when a write operation brings the data into the control module 108C-1 during the normal flow of data to write data to the data module 108D-1. In this example scenario, as the first module (control module 108C-1) processes write request, the read cache control logic 206C-1 stores a copy of the data page associated with the read request in the read cache 208C-1 if the A2H table 204C-1 contains a hash handle associated with the received data page.

In an example embodiment, the first module read cache maintains a reference count for each data page stored in the first module read cache, where the reference count indicates a number of times each data page has been read from the read cache. For example, the more times a data page is read, the more important it is to maintain that data page in the read cache. In an example embodiment, the read cache control logic 206C-1 removes at least one of the data pages from the first module read cache 208C-1 based on the reference count. In an example embodiment, it may be important to evict pages from the read cache 208C-1 that are stale. In an example embodiment, the read cache control logic 206C-1 may remove the hash handle from the A2H table 204C-1. In another example embodiment, if the hash handle is in the read cache 208C-1, the read cache control logic 206C-1 may reduce the reference count associated with the hash handle, for example, by one. In an example embodiment, if the reference count associated with a hash handle is reduced to zero, the read cache control logic 206C-1 may remove the entry (i.e., the hash handle, and the data page) from the read cache 208C-1.

In an example embodiment, the read cache control logic 206C-1 removes the data page from the first module read cache based on memory capacity associated with the first module. As noted above, each control module voluntarily adds (or doesn't add) a read cache. In an example embodiment, a control module 108C-1 may not add a read cache 208C-1 if doing so would negatively impact memory capacity associated with the control module 108C-1. In another example embodiment, the read cache control logic 206C-1 may remove a data page from a read cache 208C-1 based on memory capacity associated with the control module 108C-1.

In an example embodiment, the first module receives instruction from the second module to remove the data page from the first module read cache. In this example scenario, the data module 108D-1 assumes responsibility for evicting data pages from the read cache 208C-1 that are not referenced by any A2H entry. In an example embodiment, the data module 108D-1 detects that a reference count associated with a data page on the data module 108D-1 has gone to zero, and determines that the data page is to be deleted from either flash or tables. The data module 108D-1 transmits a message to the control module 108C-1 to discard the hash handle associated with that data page from the read cache 208C-1 on the control module 108C-1. The data module 108D-1 then deletes the data page from the back end.

In an example embodiment, the first module receives a second content-based signature from the second module. The read cache control logic 206C-1 removes a second data page associated with the second content-based signature from the first module if the second content-based signature is located in the first module, and removes the second content-based signature from the first module. In an example embodiment, the control module 108C-1 receives a write request that results in a new hash handle, and the read cache control logic 206C-1 evicts any data page that is using the new hash handle. In this example scenario, the control module 108C-1 receives a write request, and transmits the write request to the data module 108D-1. The data module 108D-1 stores the data associated with the write request and sends the "new" hash handle to the control module 108C-1. The control module 108C-1 searches the read cache 208C-1 for the "new" hash handle. If the "new" hash handle exists in the read cache 208C-1, the read cache control logic 206C-1 may evict the hash handle and the corresponding data page from the read cache 208C-1.

In an example embodiment, the first module (control module 108C-1) receives a second content-based signature from the second module (data module 108D-1) and updates a second data page associated with the second content-based signature with a new data page if the second content-based signature is located in the first module. In an example embodiment, the read cache control logic 206C-1 may replace the data page that correspond with a "new" hash handle with a new data page. Otherwise, the hash handle may correspond to "old" data, and if the control module 108C-1 were to serve up data from the read cache 208C-1, the control module 108C-1 might be serving up the "old" data now that the hash handle corresponds to "new" data. For example, the read cache 208C-1 may contain a hash handle "A" that corresponds to data. That hash handle "A" might not be used anymore. The read cache control logic 206C-1 may choose to keep that hash handle and corresponding data page in the read cache 208C-1. A host receiving data from the control module 108C-1 can only read data through the A2H table, and if the hash handle is no longer in use, that data will not be served up to the host. In another example embodiment, the control module 108C-1 receives a new address that is different from the address associated with the "A" hash handle within the A2H table 204C-1. The chance of such a collision is small, but still possible. In this example scenario, within the A2H table 204C-1, the new data corresponds to the "A" hash handle, but the read cache 208C-1 has "old" data that corresponds to the "A" hash handle. In this example scenario, the read cache control logic 206C-1 evicts the "old" data from the read cache 208C-1 so as to only serve up the "new" data when the "A" hash handle is accessed.

In an example embodiment, the control module receives a write request that overwrites the data page. In this example embodiment, the hash handle associated with the "old" data may be in the read cache. In an example embodiment, the read cache control logic 206C-1 evicts the old page from the read cache 208C-1. In another example embodiment, the read cache control logic 206C-1 consults the reference count associated with hash handle associated with the old data page, and if the read cache control logic 206C-1 determines that the hash handle was accessed from other address, the read cache control logic 206C-1 may determine whether to maintain that "old" data page in the read cache or evict it from the read cache. The "old" data page still corresponds to a hash handle that is valid even if the "old" data page is not referenced. Thus, the read cache control logic 206C-1 has the option to evict or keep data pages that have been overwritten, optimizing the read cache regarding data pages that may not be needed.

In an example embodiment, a plurality of data pages is stored in the first module read cache and each of the plurality of data pages is associated with an address and a respective content-based signature. In an example embodiment, when a subset of the plurality of data pages share the content-based signature, one of the subset of the plurality of data pages is stored in the first module read cache. Within the A2H table, multiple addresses may correspond to the same hash handle. In this example scenario, there will be a single data page in the read cache that corresponds to the multiple hash handles that are the same. Thus, by keying the read cache based on the hash handle, the read cache control logic 206C-1 is deduplication aware, and may not store the same data twice in a read cache, for addresses that have the same page data controlled by the same CPU. In other words, control modules with a read cache may perform a deduplication process as the read cache is populated and maintained.

The particular processing operations and other system functionality described above in conjunction with the flow diagram of FIG. 4 are presented by way of illustrative example only, and should not be construed as limiting the scope of the disclosure in any way. Alternative embodiments can use other types of processing operations for maintaining read caches in a distributed storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to support multiple instances of managing read caches for different storage volumes within a given storage system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the process of the flow diagram of FIG. 4 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

Illustrative embodiments of storage systems with maintaining read caches from one or more other storage systems as disclosed herein can provide a number of significant advantages relative to conventional arrangements.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to maintain read caches in a distributed storage system functionality will now be described in greater detail with reference to FIGS. 5 and 6. Although described in the context of system 100, these platforms may also be used to implement at least portions of other information processing systems in other embodiments.

Figure 5:
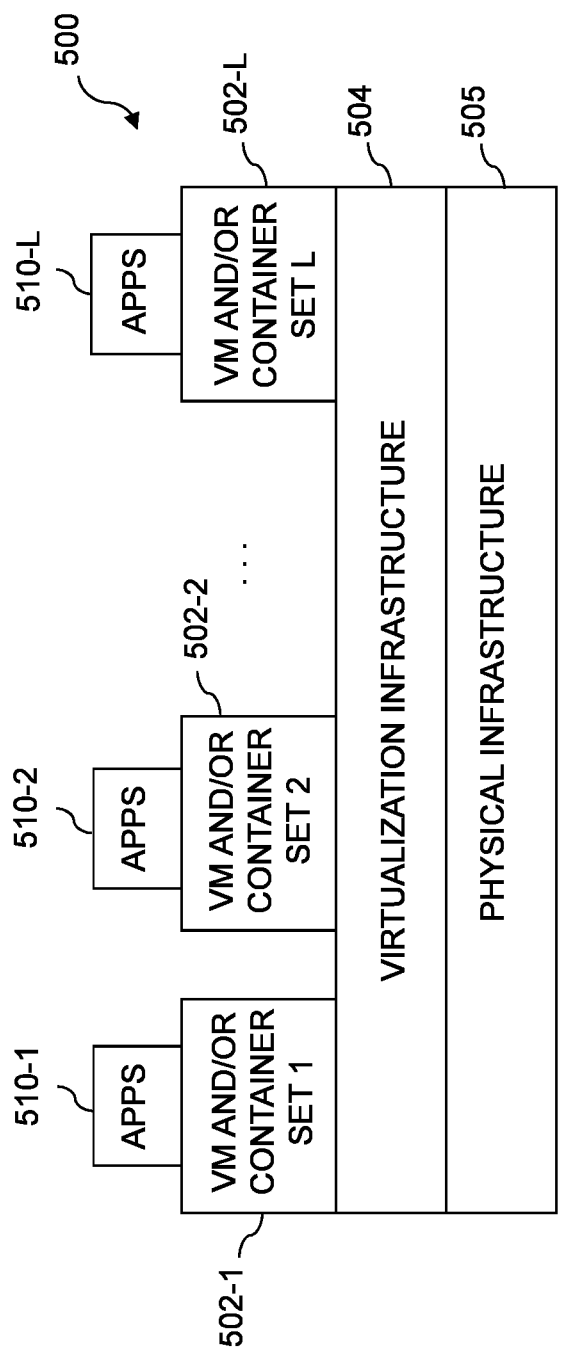
FIGS. 5 and 6 show examples of processing platforms that may be utilized to implement at least a portion of an information processing system in illustrative embodiments.
Figure 6:
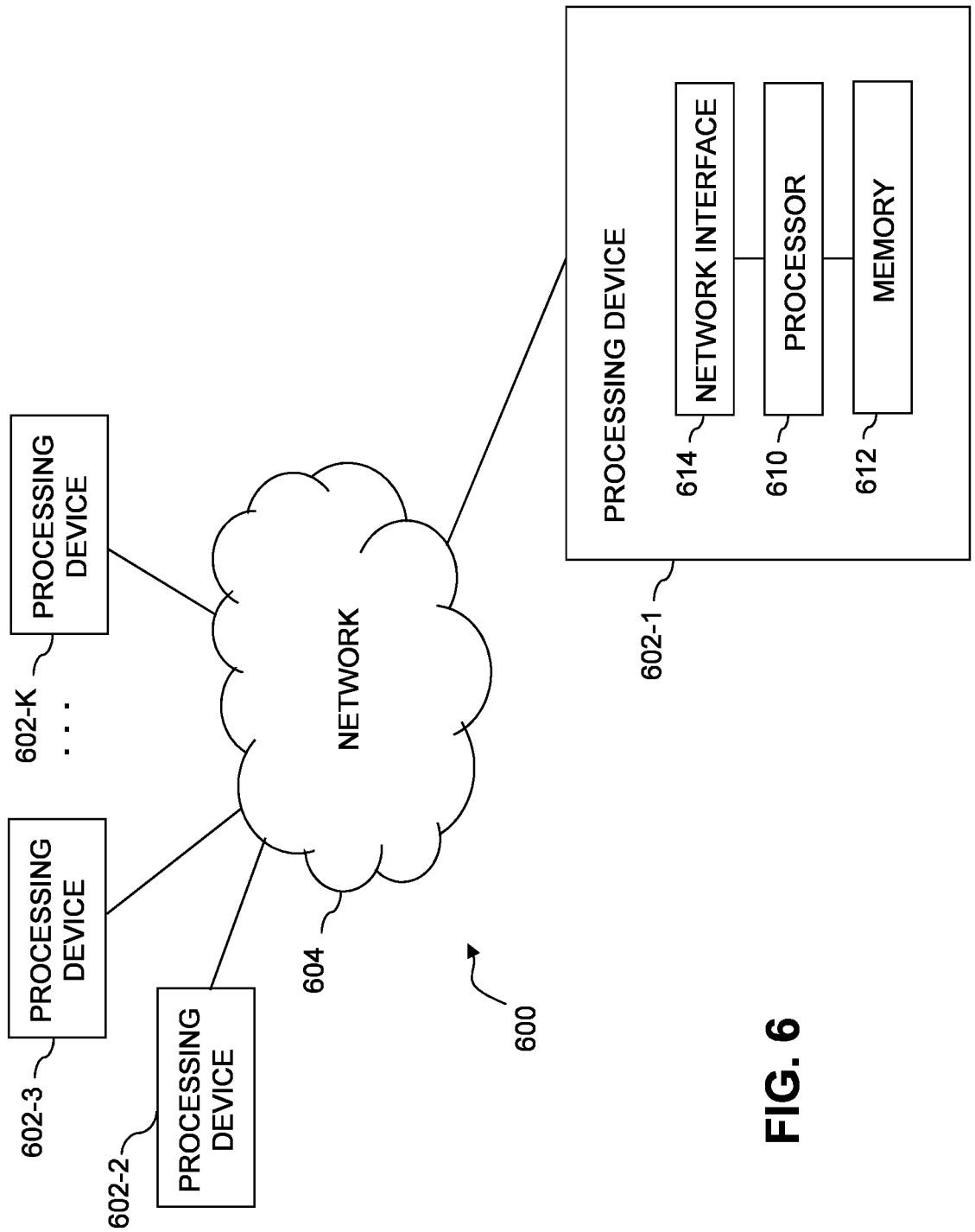

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide storage functionality of the type described above for one or more processes running on a given one of the VMs. For example, the given VM can implement one or more instances of the FIG. 4 process for managing read caches.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the FIG. 4 process for maintaining read caches.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, read cache maintenance processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for maintaining read caches in a distributed storage system, the distributed storage system comprising a first module and a second module, the first module processing read requests for an address range, to send to the second module, the method comprising:
   receiving, at the first module, an address associated with a read request for a data page stored on the second module, wherein the first module is selected based on an address associated with the data page, wherein the read request is to be processed by the first module transmitting a content-based signature to the second module to retrieve requested data from the second module;
   searching a table on the first module for a content-based signature of the data page based on the address;
   avoiding the transmitting the content-based signature to the second module to retrieve requested data from the second module by searching a first module read cache using the content-based signature, wherein the read cache is keyed on the content-based signature; and
   in response to locating the content-based signature in the read cache, providing the data page from the read cache, wherein content-based signatures in the table are associated with the address range, wherein the data page from the first module read cache is a copy of a data page stored on the second module, and wherein the cached data in the read cache is not persisted.

2. The method of claim 1 further comprising:
   maintaining a plurality of read caches for the distributed storage system wherein each of the plurality of read caches maintains cache consistency for a respective address range associated with each of the plurality of read caches.

3. The method of claim 1 further comprising:
   transmitting the read request to the second module if the content-based signature is not in the read cache.

4. The method of claim 1 wherein the first module read cache is added to the first module, wherein a plurality of modules comprises the first module, wherein each of the plurality of modules is associated with a respective address range.

5. The method of claim 4 wherein a second module read cache is not added to a second module of the plurality of modules if the second module read cache would impact memory capacity of the second module.

6. The method of claim 1 further comprising:
   removing the first module read cache from the first module if the first module read cache is impacting memory capacity of the first module.

7. The method of claim 1 further comprising:
   receiving at the first module, a read request from a third module for a second data page stored on the second module; and
   storing a copy of the second data page in the first module read cache if the second data page is associated with a second content-based signature stored in the table.

8. The method of claim 1 further comprising:
   receiving at the first module, a write request to write a second data page on the second module; and
   storing a copy of the second data page in the first module read cache if the second data page is associated with a second content-based signature stored in the table.

9. The method of claim 1 wherein the first module read cache maintains a reference count for each data page stored in the first module read cache, wherein the reference count indicates a number of times each data page has been read.

10. The method of claim 9 further comprising:
    removing at least one of the each data page from the first module read cache based on the reference count.

11. The method of claim 1 further comprising:
    removing the data page from the first module read cache based on memory capacity associated with the first module.

12. The method of claim 1 further comprising:
    receiving instruction from the second module to remove the data page from the first module read cache.

13. The method of claim 1 further comprising:
    receiving, at the first module, a second content-based signature from the second module;
    removing a second data page associated with the second content-based signature from the first module if the second content-based signature is located in the first module; and
    removing the second content-based signature from the first module.

14. The method of claim 1 further comprising:
    receiving, at the first module, a second content-based signature from the second module; and
    updating a second data page associated with the second content-based signature with a new data page if the second content-based signature is located in the first module.

15. The method of claim 1 wherein a plurality of data pages is stored in the first module read cache and wherein each of the plurality of data pages is associated with an address and a respective content-based signature, and wherein when a subset of the plurality of data pages share the content-based signature, one of the subset of the plurality of data pages is stored in the first module read cache.

16. The method of claim 1 wherein the content-based signature is a hash handle.

17. The method of claim 1 wherein the first module read cache includes volatile memory.

18. A system for use in maintaining read caches in a distributed storage system, the distributed storage system comprising a first module and a second module, the first module processing read requests for an address range, to send to the second module, the system comprising a processor configured to:
    receive, at the first module, an address associated with a read request for a data page stored on the second module, wherein the first module is selected based on an address associated with the data page, wherein the read request is to be processed by the first module transmitting a content-based signature to the second module to retrieve requested data from the second module;

search a table on the first module for a content-based signature of the data page based on the address;

avoid the transmitting the content-based signature to the second module to retrieve requested data from the second module by searching a first module read cache using the content-based signature, wherein the read cache is keyed on the content-based signature; and in response to locating the content-based signature in the read cache, provide the data page from the read cache, wherein content-based signatures in the table are associated with the address range, wherein the data page from the first module read cache is a copy of a data page stored on the second module, and wherein the cached data in the read cache is not persisted.

19. The system of claim 18 further configured to:

maintain a plurality of read caches for the distributed storage system wherein each of the plurality of read caches maintains cache consistency for a respective address range associated with each of the plurality of read caches.

20. A non-transitory computer program product for maintaining read caches in a distributed storage system, the distributed storage system comprising a first module and a second module, the first module processing read requests for an address range, to send to the second module, the computer program product comprising:

a computer readable storage medium having computer executable program code embodied therewith, the program code executable by a computer processor to:

receive, at the first module, an address associated with a read request for a data page stored on the second module, wherein the first module is selected based on an address associated with the data page, wherein the read request is to be processed by the first module transmitting a content-based signature to the second module to retrieve requested data from the second module;

search a table on the first module for a content-based signature of the data page based on the address;

avoid the transmitting the content-based signature to the second module to retrieve requested data from the second module by searching a first module read cache using the content-based signature, wherein the read cache is keyed on the content-based signature; and in response to locating the content-based signature in the read cache, provide the data page from the read cache, wherein content-based signatures in the table are associated with the address range, wherein the data page from the first module read cache is a copy of a data page stored on the second module, and wherein the cached data in the read cache is not persisted.

* * * * *